US 6,619,254 B2

(12) United States Patent
Chmela et al.

(10) Patent No.: US 6,619,254 B2
(45) Date of Patent: Sep. 16, 2003

(54) METHOD FOR OPERATING AN INTERNAL COMBUSTION ENGINE OPERATED WITH A SELF-IGNITABLE FUEL

(75) Inventors: Franz Chmela, Graz (AT); Janos Csato, Graz (AT); Michael Glensvig, Graz (AT)

(73) Assignee: AVL List GmbH, Graz (AT)

( * ) Notice: Subject to any disclaimer, the term of this patent is extended or adjusted under 35 U.S.C. 154(b) by 63 days.

(21) Appl. No.: 09/967,916

(22) Filed: Oct. 2, 2001

(65) Prior Publication Data
US 2002/0038645 A1 Apr. 4, 2002

(30) Foreign Application Priority Data
Oct. 3, 2000 (AT) ............................................. 725/00 U

(51) Int. Cl.$^7$ ................................................. F02B 9/04
(52) U.S. Cl. ...................................... 123/276; 123/305
(58) Field of Search ................................. 123/276, 305

(56) References Cited

U.S. PATENT DOCUMENTS

| 3,125,079 | A | * | 3/1964 | Hoffman | 123/262 |
| 4,126,106 | A | | 11/1978 | Witzky | 123/262 |
| 4,594,976 | A | * | 6/1986 | Gonzalez | 123/260 |
| 4,765,293 | A | | 8/1988 | Gonzalez | 123/275 |
| 5,170,758 | A | * | 12/1992 | Chmela | 123/276 |
| 5,832,880 | A | * | 11/1998 | Dickey | 123/25 C |
| 6,105,550 | A | * | 8/2000 | Nieberding | 123/294 |
| 6,125,817 | A | * | 10/2000 | Piock et al. | 123/301 |
| 6,213,086 | B1 | * | 4/2001 | Chmela et al. | 123/276 |

FOREIGN PATENT DOCUMENTS

| AT | 003135 | 10/1999 |
| DE | 2851504 | 6/1980 |
| DE | 3433559 | 3/1986 |
| DE | 3736630 | 5/1989 |
| DE | 3632579 | 7/1990 |
| DE | 19818596 | 11/1999 |
| WO | 9807973 | 2/1998 |

OTHER PUBLICATIONS

Gray et al., "Homogeneous Charge Compression Ignition (HCCI) of Diesel Fuel" in SAE 971676, May 5–8, 1997.
Aoyama et al., "An Experimental Study on Premixed-Charge Compression Ignition Gasoline Engine" in SAE 960081, Feb. 26–29, 1996.

* cited by examiner

Primary Examiner—Willis R. Wolfe
Assistant Examiner—Douglas A. Salser
(74) Attorney, Agent, or Firm—Dykema Gossett PLLC

(57) ABSTRACT

The invention relates to a method for operating an internal combustion engine operated with a self-ignitable fuel, with an approximately homogeneous fuel-air mixture being produced in the combustion chamber in the self-ignition ranges (CI), a high compression ratio suitable for a self-ignition of the fuel being provided and the combustion occurring in the self-ignition ranges (CI) predominantly by self-ignition. In order to control the start of combustion in the self-ignition range (CI) in the easiest possible way it is provided that in the self-ignition range (CI) the pressure and/or temperature of the homogeneous fuel-air mixture are set in such a way, preferably depending on the charge composition and/or charge temperature, that the self-ignition would be achieved only after the actually desired start of combustion in the zone of the upper dead center and the combustion of the homogeneous fuel-air mixture is initiated locally in the self-ignition range (CI) by an external energy impulse.

22 Claims, 2 Drawing Sheets

METHOD FOR OPERATING AN INTERNAL COMBUSTION ENGINE OPERATED WITH A SELF-IGNITABLE FUEL

BACKGROUND OF THE INVENTION

The invention relates to a method for operating an internal combustion engine operated with a self-ignitable fuel, with an approximately homogeneous fuel-air mixture being produced in the combustion chamber in the self-ignition ranges, a high compression ratio suitable for a self-ignition of the fuel being provided and the combustion occurring in the self-ignition ranges predominantly by self-ignition, as well as an internal combustion engine to perform the method.

DESCRIPTION OF THE PRIOR ART

From the publication "Homogeneous Charge Compression Ignition (HCCI) of Diesel Fuel", Allen W. Gray et al., SAE 971676, it is known that during the combustion of a lean fuel-air mixture ignited by self-ignition extremely low emission values for $NO_x$ and exhaust particulates are achieved as a result of the homogeneous distribution of concentration and temperature. This method is known in the English-speaking countries as the HCCI method ( Homogeneous Charge Compression Ignition) . It is further known that diesel fuel causes difficulties in this combustion method because the time of ignition can be fixed due to its high ignition performance only in the desired manner at a low compression ratio and low mean effective pressure shortly before the upper dead center. The required low compression ratio of approx. 10 leads to considerable disadvantages concerning the specific fuel consumption and the achievable output yield as compared with conventional diesel methods which to date have prevented the wide-scale use of this actually very low-emission combustion method. A further difficulty relating to the diesel fuel is the position of the boiling range of between 170° C. and 360° C. which is obstructive to the evaporation and thus to the homogenization of the cylinder charge and which can lead to high emissions of $NO_x$, exhaust particulates and non-burned hydrocarbons and the likelihood of enrichment of diesel fuel in the lubricating oil.

Due to its very low ignition performance and the lower boiling range of between approx. 30 and 190° C., gasoline has clear advantages for the HCCI method. The compression ratio can be raised to values of approx. 15 to 17, as in the diesel engine. However, the achievable mean effective pressure is limited in a disadvantageous manner in this case too to the part-load range, as is disclosed in the publication "An Experimental Study on Premixed-Charge Compression Ignition Gasoline Engine", Taro Aoyama et al., SAE 960081.

Furthermore, from DE 36 32 579 C2 a spark-ignited, air-compressing internal combustion engine is known which operates like a diesel engine at a high compression ratio, in which a charge stratification is produced in order to ensure the ignition of the air-fuel mixture. This stratified charge combustion method is also known as the SCSI method ( Stratified Charge Spark Ignition). The principle of the stratified charge ensures that the mixture composition remains long enough within the ignition limits in the zone of the ignition source during the spark discharge in order to produce a flame which is sufficiently large enough for the continued combustion of the cylinder charge. Such a stratified charge combustion method with spark ignition is not as advantageous with respect to emissions as the HCCI method, but can be operated with much higher mean pressures and is much better than the diesel engine concerning exhaust particulate emissions.

A method is known from DE 28 51 504 A1 for operating an internal combustion engine with a variable compression ratio, with the internal combustion engine being spark-ignited with one type of fuel and being operated with self-ignition. In this internal combustion engine the compression ratio to perform the self-ignition is increased in the part-load range and reduced in the full-load range for spark-ignition operation. Fuel for diesel operation is supplied by way of an injection nozzle opening into the main combustion chamber or a pre-combustion chamber, thus obtaining an inhomogeneous fuel-air mixture in the combustion chamber. As a result, there is no HCCI operation. The supply of the fuel for the spark-ignition operation is performed in one embodiment via a carburetor and in another embodiment via a further injection nozzle opening into a side combustion chamber. The combustion is initiated in the spark-ignition operation by way of a spark plug opening into the side combustion chamber. In the case of spark ignition with fuel injection and air intake in full-load operation, there is a charge concentration in the side combustion chamber relative to the main combustion chamber. The known method allows a stable operating behavior and a favorable efficiency. The extremely low emission values as known from the HCCI method cannot be achieved, however.

U.S. Pat. No. 4,126,106 A also describes an internal combustion engine which can be operated both according to the Otto as well as the diesel method. A stratified charge is produced during the starting phase and the part-load operation under direct injection of fuel into the combustion chamber and a combustion by spark ignition of said stratified charge is initiated. Under full load, however the fuel is injected directly into the combustion chamber against the hot walls of the combustion chambers, with the fuel evaporating and the ignition being performed by compression according to the diesel method. The engine is operated at a compression ratio of less than 16:1. At a higher engine load the time between the start of the injection and the time of the self-ignition is insufficient for a favorable preparation of the mixture, which is why a deterioration of the combustion sequence and the emissions occurs. Furthermore, from U.S. Pat. No. 3,125,079 A, a multi-purpose internal combustion engine is known which can be operated both with self-ignition as well as spark ignition with a fixed compression ratio of 15:1. The fuel is injected directly radially into the combustion chamber via a multi-jet injection nozzle. This is not suitable for producing a high degree of charge stratification.

In order to improve the exhaust gas quality in an internal combustion engine for spark- and self-ignitable fuel while simultaneously providing a high efficiency, it is proposed in AT 003 135 U1 to produce an at least approximately homogeneous fuel-air mixture in the combustion chamber in the self-ignition range. This method comprises the advantages of the HCCI method and avoids its disadvantages under high engine load by changing over to spark ignition. The method thus combines the advantages of the HCCI method with those of the SCSI method. However, the start of the combustion of the homogeneous fuel-air mixture can only be controlled with difficulty, because in order to attain homogenization, the formation of the mixture occurs in the suction pipe or very far before the start of the combustion. Accordingly, there is no direct possibility to control the start of the combustion by the start of the injection (as in the diesel engine) or by the ignition spark (as in the Otto engine).

An HCCI engine would require a complex control system for considering or setting a large number of operational parameters for the purpose of controlling the start of the ignition. This would lead to high requirements in respect of control.

SUMMARY OF THE INVENTION

It is the object of the present invention to avoid such disadvantages and to control in the simplest possible way the start of the combustion in the self-ignition range in an internal combustion engine operated with a self-ignitable homogeneous fuel-air mixture.

This occurs in accordance with the invention in such a way that in the self-ignition range the pressure and/or temperature of the homogeneous fuel-air mixture are set in such a way, preferably depending on the charge composition and/or charge temperature, that the self-ignition would be achieved only after the actually desired start of combustion in the zone of the upper dead center and the combustion of the homogeneous fuel-air mixture is initiated only by an external energy impulse. The charge is therefore led up to the self-ignition capability only up to a certain distance. The initiation of the combustion is performed by an external energy impulse. This energy impulse is used to raise the energy level of the charge up to self-ignition capability, whereupon the entire cylinder charge reaches the self-ignition capability following a short further delay in ignition and burns out.

The external energy impulse can be an electric ignition spark. It can also be provided, however, that the combustion of the homogeneous fuel-air mixture is initiated in the self-ignition range by the self-ignition of a pilot fuel quantity injected directly before the start of the combustion.

The method can be preferably used for operating an internal combustion engine operated both with spark- as well as self-ignitable fuel, especially gasoline, with the engine operating range being associated with self-ignition and spark-ignition ranges and the combustion in the spark-ignition range being initiated by the spark ignition of the fuel-air mixture and with the part-load range being assigned to the self-ignition range, the full-load range and/or engine operating ranges with high engine load as well as the cold start to the spark-ignition range. In this way the advantages of the HCCI method can be utilized and, by changing over to spark ignition, its disadvantages under high engine load can be avoided. In addition to the self-ignition ranges, a homogeneous fuel-air mixture can be provided in the combustion chamber in at least one spark-ignition range. The homogeneous fuel-air mixture can be stoichiometric or lean. Particularly low fuel consumptions and low emissions can be achieved, however, when a stratified charge is produced in the combustion chamber in the spark-ignition ranges.

At a higher engine load, the time between the start of the injection and the time of the self-ignition would not be sufficient in the HCCI method for a favorable preparation of the mixture, which is why a deterioration of the combustion sequence and the emissions would occur in the case of a self-ignition. Since a spark ignition occurs in the full-load range and/or in engine operating ranges with high engine loads, such disadvantages are avoided. Emissions can thus be improved considerably both in the part-load as well as the full-load range.

Although the SCSI method is not as favorable as the HCCI method with respect to emissions, it still offers the two following advantages as compared with the DI method (direct injection) of a conventional diesel engine with respect to the formation of emissions. On the one hand, the lower tendency of gasoline to form exhaust particulates as compared with diesel fuel is mainly due to the smaller size of the molecules and the concomitant vapor pressure which benefits the formation of the mixture. On the other hand, the method feature of spark ignition offers the additional element of freedom as compared with the diesel engine to be able to strongly increase the time between the start of ignition and the ignition by choosing the distance between start of ignition and time of ignition, thus clearly extending the time available for preparing the mixture, with the stratified charge principle preventing that the quantity of premixed charge which is formed before the ignition and thus the initial speed of pressure rise would become to high.

In engine operating ranges with a homogeneous fuel-air mixture in the combustion chamber, the homogenization of the fuel-air mixture can preferably be performed by external mixture formation, preferably by injection of the fuel into the suction pipe. In engine operating ranges with a stratified charge in the combustion chamber, however, the fuel is always injected directly into the combustion chamber.

The homogenization of the fuel-air mixture in the self-ignition range can also occur by direct injection of the fuel into the combustion chamber. For this purpose the injection device can be designed with changeable injection characteristics. Changeable injection characteristics can be achieved with stroke-variable injection nozzles or with double-needle injection nozzles. A homogenization of the fuel-air mixture can also be realized by different injection pressures of the direct-injecting injection device. In order to allow the defined control of the mixture formation also via the jet quality, an air-supported injection device may be advantageous.

The changeover between self-ignition and spark ignition is performed depending on the mean effective pressure of the work process at a predetermined limit value of the mean effective pressure. The self-ignition range lies below said limit value and the spark ignition range above said spark ignition range. The limit value is defined in a range of the mean effective pressure in which the induced mean pressure is between approx. 4 to 9 bars, preferably between approx. 6 to 9 bars, and especially preferably between approx. 7 to 8.5 bars, with the speed of pressure rise of the cylinder pressure preferably being smaller than or equal to 5 bars per degree of crank angle. The method in accordance with the invention can be used to define the time of the start of combustion of the homogeneous fuel-air mixture in the self-ignition range to such a precise extent as previously was only possible in non-homogeneous self-igniting charges by the injection time or, in the case of spark-igniting charges, by the ignition point.

BRIEF DESCRIPTION OF THE DRAWINGS

The invention is now explained in closer detail by reference to the drawings, wherein:

FIG. 2 shows additional elements disposed in the cylinder head in broken lines.

DETAILED DESCRIPTION OF THE PREFERRED EMBODIMENTS

Figure 1:
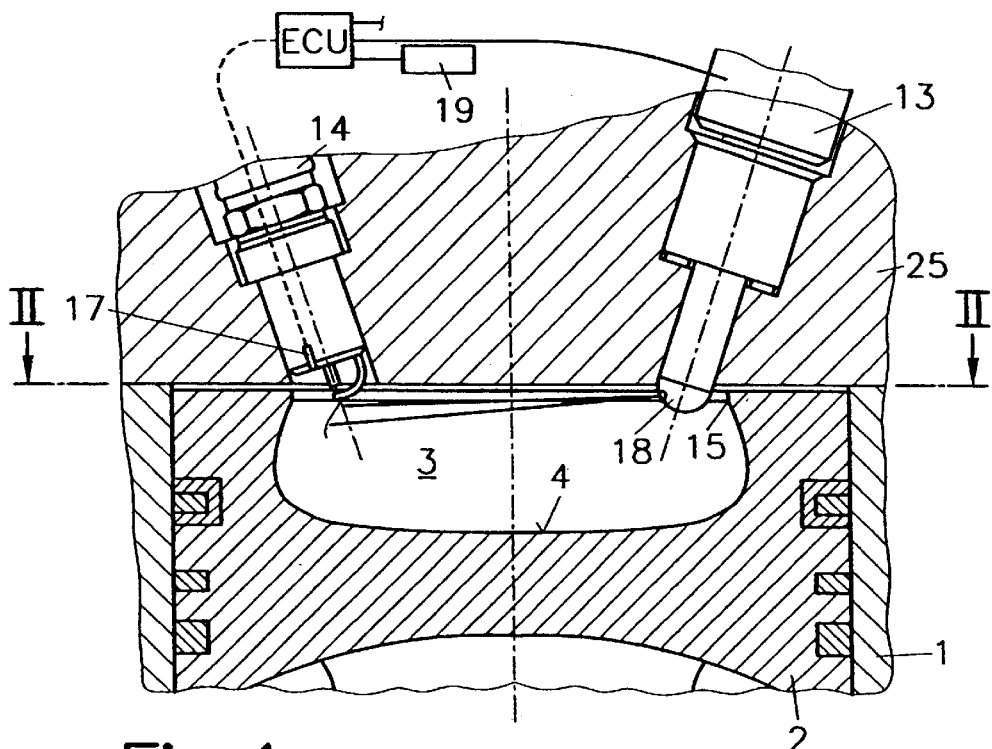
FIG. 1 shows a longitudinal sectional view through an internal combustion engine along line I—I in FIG. 2.
Figure 2:
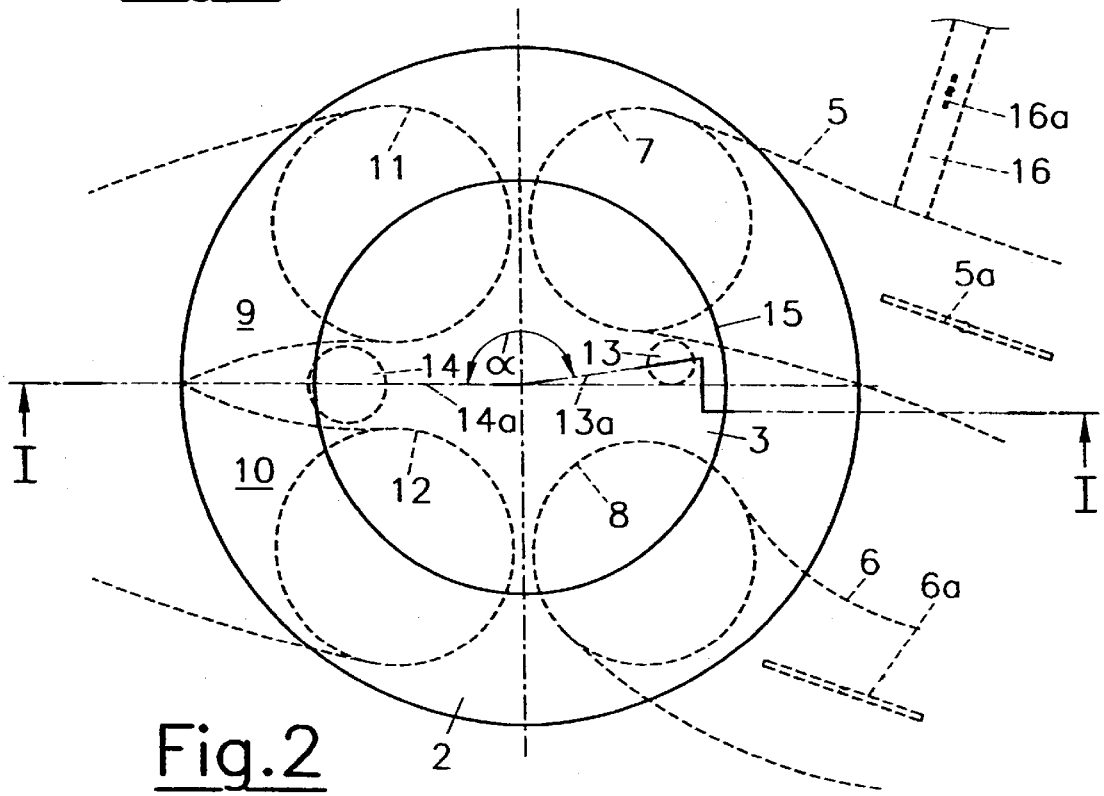
FIG. 2 shows a top view of a cylinder along line II—II in FIG. 1.

FIG. 1 shows the piston 2 reciprocating in cylinder 1 in its upper dead center position. The piston 2 is provided with a piston trough 4 forming a combustion chamber 3. Intake ports 6, 7 are arranged in the cylinder head 25, of which at least one intake part 6 is provided with an arrangement so as to produce a swirl, as is indicated in FIG. 2 with the broken lines. Each one of the intake ports 5, 6 leads to an intake valve 7, 8. Furthermore, exhaust ports 9, 10 are disposed in the cylinder head which open by way of exhaust valves 11, 12 into the combustion chamber 3.

An injection device 13 is provided in the cylinder head 25 for the direct injection of fuel into the combustion chamber 3 as well as a high-voltage spark plug 14 forming the ignition device, with both the injection device 13 as well as the spark plug 14 being disposed in the zone of the edge 15 of the retracted piston trough 4 having the shape of a body of revolution.

The nozzle 18 of the injection device 13 is provided with a single-jet or double-jet nozzle with favorable jet resolution and an air connection for air support (not shown in closer detail). The injection device 13 is connected with an injection system which is also not shown in closer detail and with which it is possible to realize at least two different pressure levels.

The piercing points of the axis 14a of the spark plug 14 and the axis 13a of the injection device 13 through the fire deck of the cylinder head are provided, when seen in a plan view, with a central angle α towards one another of approx. 90° to 200°, preferably 120°. The spark plug is disposed downstream about this angle in the direction of swirl.

At least one of the intake ports 5, 6 is connected with an exhaust gas recirculation system 16 with an exhaust gas control member 16a with which exhaust gas can be introduced into the intake flow.

In order to detect the ignition point, a suitable sensor 17 is provided which can be integrated in the spark plug 14 for example. The ignition point can be detected through the speed of pressure rise in the cylinder or optically. The sensor 17 is connected with an electronic control unit ECU which, depending on the ignition point, controls the injection time of the injection device 13 as well as the temperature and the exhaust gas recirculation quantity of the exhaust gas recirculation system 16.

An intake control member 5a or 6a is disposed in at least one of the two intake ports 5, 6 in order to change the swirl in the combustion chamber 3. A swirl with a relatively high intake swirl count, i.e. a swirl count of higher than 2, should be achievable with the intake ports 5, 6.

The internal combustion engine is further provided with a variable valve control device 19 for the intake valves 7, 8 and the exhaust valves 11, 12 with which the closing time of at least one intake valve 7, 8 and the opening and/or closing time of at least one exhaust valve 11, 12 can be changed. The variable valve control device 19 can be formed by a known electric, hydraulic, pneumatic or mechanical valve control apparatus for changing the control time. The valve control is also performed via the electronic control unit ECU.

The internal combustion engine is operated in the cold start phase with a homogeneous mixture with spark ignition. When the internal combustion engine has reached operating temperature, the compression ratio is raised in the part-load range to an approximate value required for the self-ignition of the gasoline of 14:1 to approx. 18:1. In order to enable the precise control of the self-ignition point, pressure, temperature and composition of the charge are set in such a way that the self-ignition capability is just short of being reached. As a result of an additional outside energy impulse the level of the self-ignition capability is reached, whereupon, after the progression of a certain delay in ignition, the entire cylinder charge burns out. The initiation of the additional external energy impulse can be performed by an ignition spark of an ignition device (such as a spark plug 14) or by the self-ignition of an additionally injected small quantity of fuel. In the self-ignition range the fuel is supplied to the injection device 13 under a relatively high pressure. A favorable spray resolution of the fuel jet is achieved by the nozzle 18 of the injection device 13. The injection point of the injection device 13 can be set through the control unit ECU depending on the ignition point which is detected through the ignition detection device 17. A particularly favorable homogenization of the fuel-air mixture during the self-ignition range CI can also be achieved by a known external mixture formation device such as suction pipe injection device 26 as indicated with the broken line in FIG. 2 or by a carburetor. The mixture is thus prepared and homogenized even outside of the combustion chamber 3. The start of the opening of the intake valves 7, 8 is controlled in such a way that a relatively high compression ratio can be achieved. In order to raise the charge temperature, the control times of the exhaust valves 11, 12 can be changed in order to achieve an internal exhaust gas recirculation.

With rising load, the time of ignition moves in the direction towards early, which can have a disadvantageous effect on the combustion progress and thus on the specific fuel consumption and the output yield. In the higher load range the internal combustion engine is therefore no longer operated according to the HCCI method, but according to the SCSI method. The ignition device 14 is again activated via the control unit ECU, the injection device 13 is supplied with fuel by way of the injection system which is not shown in closer detail, the intake flow is supplied with cooled exhaust gas and the compression ratio is reduced by the adjustment of the valve control. During the injection in the spark ignition range SI, the fuel is introduced close to the wall of the combustion chamber 3 and a marked charge stratification is achieved. Since no homogenization of the fuel-air mixture is required in the spark-ignition range SI, the injection time can be set relatively late in comparison with the injection time in the self-ignition range CI.

Figure 3:
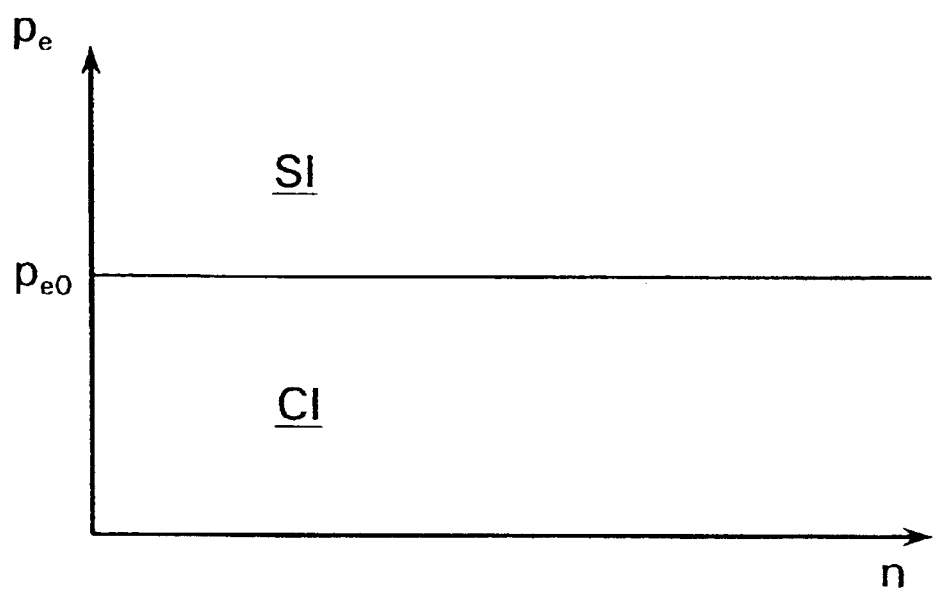
FIG. 3 shows a diagram in which the mean effective pressure is entered over the engine speed.

The changeover between self-ignition operation and spark-ignition operation is advantageously performed depending on the mean effective pressure $p_e$, as is shown in FIG. 3. In FIG. 3, the mean effective pressure $P_e$ is entered over the engine speed n. The self-ignition range CI is located below a predefined limit value $P_{eo}$ of the mean effective pressure $P_e$, at which the induced mean pressure lies between 4 to 9 bars, preferably between 6 to 9 bars, and especially preferably between 7 to 8.5 bars. The spark-ignition range SI is disposed above the limit value $P_{eo}$. The speed of pressure rise dp/dφ of the cylinder pressure p over the crank angle φ is for noise reasons smaller than or equal to 5 bars per degree of crank angle φ. The engine management system uses the calculated injection quantity as a control variable.

In the described internal combustion engine and the outlined method only one type of fuel is used, which in addition to gasoline could also be a gas or an alcohol or a mixture of said components.

The method in accordance with the invention allows defining the time of the start of ignition of the homogeneous fuel-air mixture in the self-ignition range to such a precise extent as was previously only possible in non-homogeneous self-igniting charges by the injection point or, in the case of spark-igniting charges, by the ignition point.

Although the method in accordance with the invention is described for a four-valve internal combustion engine, it is also suitable for internal combustion engines with other numbers of valves, e.g. for two- or three-valve internal combustion engines.

What is claimed is:

1. A method for operating an internal combustion engine operated with a self-ignitable fuel, with an approximately homogeneous fuel-air mixture being produced in a combustion chamber in at least one self-ignition range, a high compression ratio suitable for a self-ignition of the fuel being provided and the combustion occurring in the self-ignition range predominantly by self-ignition, wherein in the self-ignition range the pressure or temperature of the homogeneous fuel-air mixture are set in such a way, that the self-ignition would be achieved only after the actually desired start of combustion in the zone of the upper dead center and the combustion of the homogeneous fuel-air mixture is initiated locally in the self-ignition range by an external energy impulse.

2. The method according to claim 1, wherein in the self-ignition range the pressure or temperature of the homogenous fuel-air mixture are set depending on the charge composition or charge temperature.

3. The method according to claim 1, wherein the combustion of the homogeneous air-fuel mixture in the self-ignition range is initiated by an electric ignition spark.

4. The method according to claim 1, wherein the combustion of the homogeneous fuel-air mixture is initiated in the self-ignition range by the self-ignition of a pilot fuel quantity injected directly before the start of the combustion.

5. The method according to claim 1, for operating an internal combustion engine operated both with spark- as well as self-ignitable fuel, especially gasoline, with the engine operating range being associated with self-ignition and spark-ignition ranges and the combustion in the at least one spark-ignition range being initiated by the spark ignition of the fuel-air mixture and with the part-load range being assigned to the self-ignition range, the full-load range or engine operating ranges with high engine load as well as the cold start to the spark-ignition range, wherein a stratified charge is produced in the combustion chamber in at least one spark-ignition range.

6. The method according to claim 1, for operating an internal combustion engine operated both with spark- as well as self-ignitable fuel, especially gasoline, with the engine operating range being associated with self-ignition and spark-ignition ranges and the combustion in the at least one spark-ignition range being initiated by the spark ignition of the fuel-air mixture and with the part-load range being assigned to the self-ignition range, the full-load range or engine operating ranges with high engine load as well as the cold start to the spark-ignition range, wherein a homogeneous fuel-air mixture is produced in the combustion chamber in at least one spark-ignition range.

7. The method according to claim 1, wherein in engine operating ranges with a homogeneous fuel-air mixture in the combustion chamber, the homogenization of the fuel-air mixture can be performed by external mixture formation.

8. The method according to claim 7, wherein the homogenization of the fuel-air mixture can be performed by injection of the fuel into the suction pipe.

9. The method according to claim 1, wherein in engine operating ranges with a homogeneous fuel-air mixture in the combustion chamber, the homogenization of the fuel-air mixture can be performed by internal mixture formation.

10. The method according to claim 5, wherein the fuel is injected directly into the combustion chamber in engine operating ranges with stratified charges in the combustion chamber.

11. The method according to claim 9, wherein in operating ranges with a homogeneous fuel-air mixture the injection is performed with higher pressure than in operating ranges with stratified charges.

12. The method according to claim 5, wherein the changeover between self-ignition and spark ignition is performed at a predetermined limit value of the induced mean effective pressure, below which there is disposed the self-ignition range and above which the spark-ignition range.

13. The method according to claim 12, wherein the limit value is defined in a range of the mean effective pressure in which the induced mean pressure is between approx. 4 to 9 bars.

14. The method according to claim 13, wherein the limit value is defined in a range of the mean effective pressure in which the induced mean pressure is preferably between approx. 6 to 9 bars.

15. The method according to claim 13, wherein the limit value is defined in a range of the mean effective pressure in which the induced mean pressure is especially preferably between approx. 7 to 8.5 bars.

16. The method according to claim 13, wherein the speed of pressure rise of the cylinder pressure is smaller than or equal to 5 bars per degree of crank angle.

17. An internal combustion engine for performing the method according to claim 1, wherein for setting the start of the combustion in the self-ignition range the pressure or temperature of the homogeneous fuel-air mixture are controllable, and that for initiating the combustion of the homogeneous fuel-air mixture in the self-ignition range an external energy impulse can be introduced locally.

18. The internal combustion engine according to claim 17, wherein in the self-ignition range the pressure or temperature of the homogenous fuel-air mixture are controllable depending on the charge composition or the charge temperature.

19. An internal combustion engine according to claim 17, wherein the external energy impulse is an electric ignition spark of a spark plug.

20. The internal combustion engine according to claim 17, wherein the external energy impulse is a self-ignited pilot fuel quantity injected via an injection device immediately before the start of the combustion.

21. The internal combustion engine according to claim 17, wherein for changing the temperature of the homogeneous fuel-air mixture an internal or external exhaust gas recirculation system is provided for recirculating exhaust gas to the intake flow.

22. The internal combustion engine according to claim 17, wherein a device for changing the effective compression ratio is provided for changing the pressure of the homogeneous fuel-air mixture in the combustion chamber.

* * * * *